United States Patent [19]
Miller

[11] 3,927,306
[45] Dec. 16, 1975

[54] HELICOPTER FLIGHT PATH CONTROL

[75] Inventor: Harry Miller, Scottsdale, Ariz.

[73] Assignee: Sperry Rand Corporation, New York, N.Y.

[22] Filed: Mar. 29, 1974

[21] Appl. No.: 456,321

[52] U.S. Cl. ........ 235/150.22; 244/17.13; 244/77 D
[51] Int. Cl.² ...................... G06G 7/70; B64C 13/50
[58] Field of Search............. 235/150.22; 244/17.13, 244/77 D, 77 G

[56] References Cited
UNITED STATES PATENTS

| | | | |
|---|---|---|---|
| 3,449,713 | 6/1969 | Kaiser......................... | 235/150.22 X |
| 3,577,120 | 5/1971 | Sherbert, Jr. .............. | 235/150.22 X |
| 3,627,238 | 12/1971 | Menn............................... | 244/77 D |
| 3,691,356 | 9/1972 | Miller........................... | 235/150.22 |
| 3,697,022 | 10/1972 | Autechaud et al. .............. | 244/77 A |
| 3,800,127 | 3/1974 | Knemeyer et al............. | 235/150.22 |

*Primary Examiner*—Edward J. Wise
*Attorney, Agent, or Firm*—Howard P. Terry

[57] ABSTRACT

Selectable flight path angle guidance of the accelerating or decelerating flight of a VTOL aircraft such as a helicopter in take off or landing maneuvers is provided by cooperative use of a novel flight director system and the thrust and pitch attitude controls of the aircraft, thrust control being employed to maintain a selected flight path angle, while pitch attitude is used to control acceleration or deceleration of the craft to a constant speed which is a function of the selected flight path angle.

17 Claims, 6 Drawing Figures

HELICOPTER FLIGHT PATH CONTROL

BACKGROUND OF THE INVENTION

1. Field of the Invention

The invention relates generally to flight path control systems for operation of aircraft such as VTOL aircraft under low visibility conditions and more particularly to novel instruments for flight guidance of helicopters by the observation of cooperative and simultaneous flight director display elements for directing or governing the operation of the thrust and pitch attitude controls of the craft or by the automatic governing of such controls.

2. Description of the Prior Art

In the past, it has generally been the custom in take off and landing maneuvers with aircraft such as helicopters for the human pilot to rely upon his expertness in handling the craft and his ability to observe and to interpret ground cues and to react to them. In this manner, the experienced helicopter pilot maintains with some success proper craft airspeed as a function of his proximity to the ground. In this empirical process, the pilot must properly increase airspeed as altitude increases, and vice versa, so that a safe landing can be made from a low altitude should engine failure occur at low airspeed when the autorotation characteristics of the craft are ineffective. Under low visibility conditions for landing and take off situations, the pilot is not always able to exercise proper judgment and the consequence of such misjudgment and engine failure at low airspeed can obviously be serious.

SUMMARY OF THE INVENTION

The object of the present invention is to provide a control system for achieving flight along a selectable flight path angle in the accelerating or decelerating flight of a helicopter, particularly in take off or landing maneuvers covering the range between the hovering mode and safe airspeed. In the present invention, a collective pitch regulating signal for the control of thrust is developed which is the algebraic summation of electrical signals representing a selectable flight path command angle, the actual flight path angle of the craft, and the time rate of change of the latter. Secondly, a cyclic pitch regulating signal for the control of pitch attitude is generated as a summation of electrical signals corresponding to a predetermined or preset command acceleration along the selected flight path, actual craft acceleration along the command flight path, the time rate of change of craft pitch attitude, and the square of craft velocity. When the two regulating signals are adjusted to zero and maintained at zero by manual operation of the thrust and pitch attitude controls of the craft through observation of cooperating flight director display elements, responsive to the regulating signals, the desired flight behavior of the craft is achieved.

The combined control of collective and cyclic rotor blade pitch assures that the helicopter airspeed will properly increase as its altitude increases and, conversely, can be programmed to decrease as altitude decreases. Such operation minimizes the consequence of any engine failure since, according to the invention, the hovering and low airspeed modes of the craft then occur only at low altitudes above the terrain. It is thus possible during take off, for example, to accelerate the helicopter along a flight path which makes a constant angle with respect to the horizon, permitting the vehicle rapidly to attain a safe airspeed as it increases its altitude.

DESCRIPTION OF THE PREFERRED EMBODIMENTS

Analytical Background of the Invention

Figure 1:
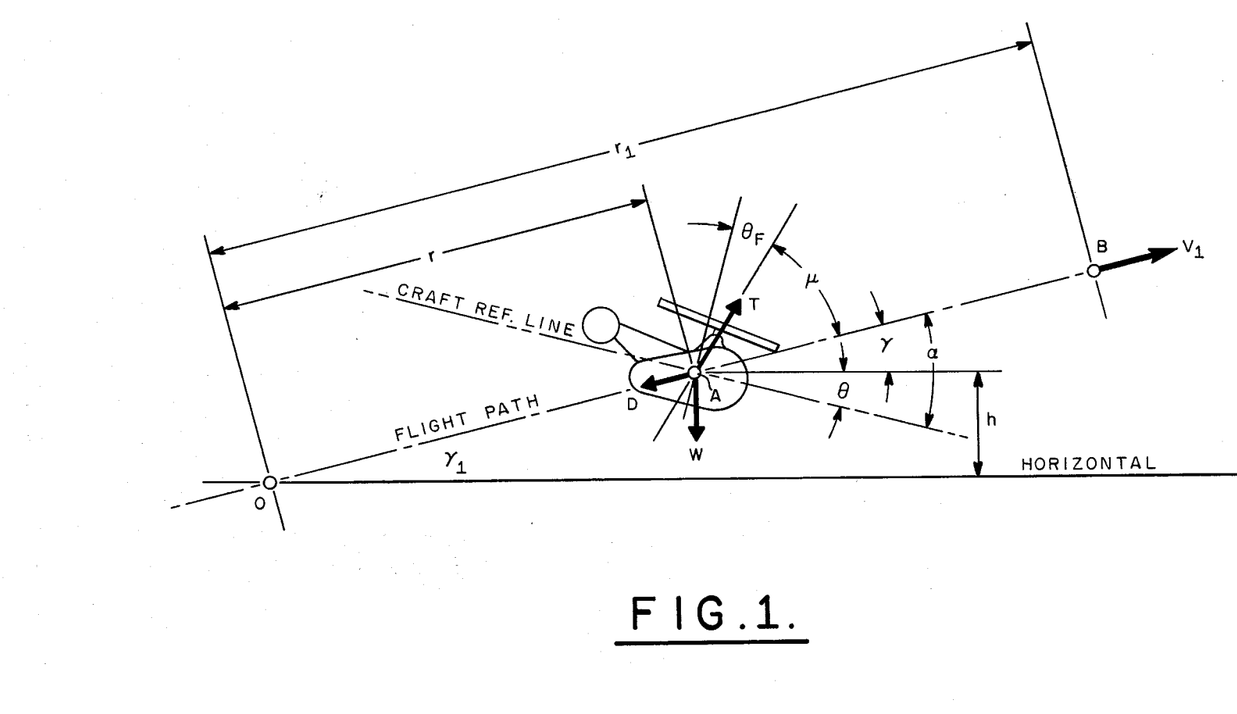
FIG. 1 is a vector diagram illustrating parameters of interest in the flight of a helicopter and useful in explaining operation of the invention.

FIG. 1 illustrates the problem of operating a helicopter along a straight flight path which starts at a hover point 0 near the ground and accelerating along a straight flight path as the helicopter climbs away from the hover point toward a point B where the flight path acceleration drops to zero and the craft is moving at a uniform velocity $V_1$. It should be understood that a similar problem exists for the inverse situation where the helicopter is required to be decelerated from a constant velocity $V_1$ to the hover point 0 during the landing maneuver.

It is assumed that the thrust control of the helicopter is manipulated to maintain the aircraft on a path OB where the angle $\gamma_1$ of the flight path with respect to the horizontal through the starting hover point 0 is constant and selectable. It is further hypothesized that the pitch attitude control is manipulated in a manner which causes the flight path acceleration $\dot{V}$ to be a function of flight path velocity $V$ in accordance with the following relationship:

$$\dot{V} = \dot{V}_{COM} - k_1 V^2 \tag{1}$$

where $\dot{V}_{COM}$ is a selectable constant and $k_1$ is a second selectable constant which is scaled with respect to $\dot{V}_{COM}$ such that the acceleration at point B is zero when the velocity achieves a constant value $V_1$. Under these conditions, it is apparent that:

$$V_1^2 = \frac{\dot{V}_{com}}{k_1} \tag{2}$$

While in the preferred embodiment the function of V is chosen and analyzed as a square function, it is possible depending upon the application, that other functions of V may be employed.

Figure 2:
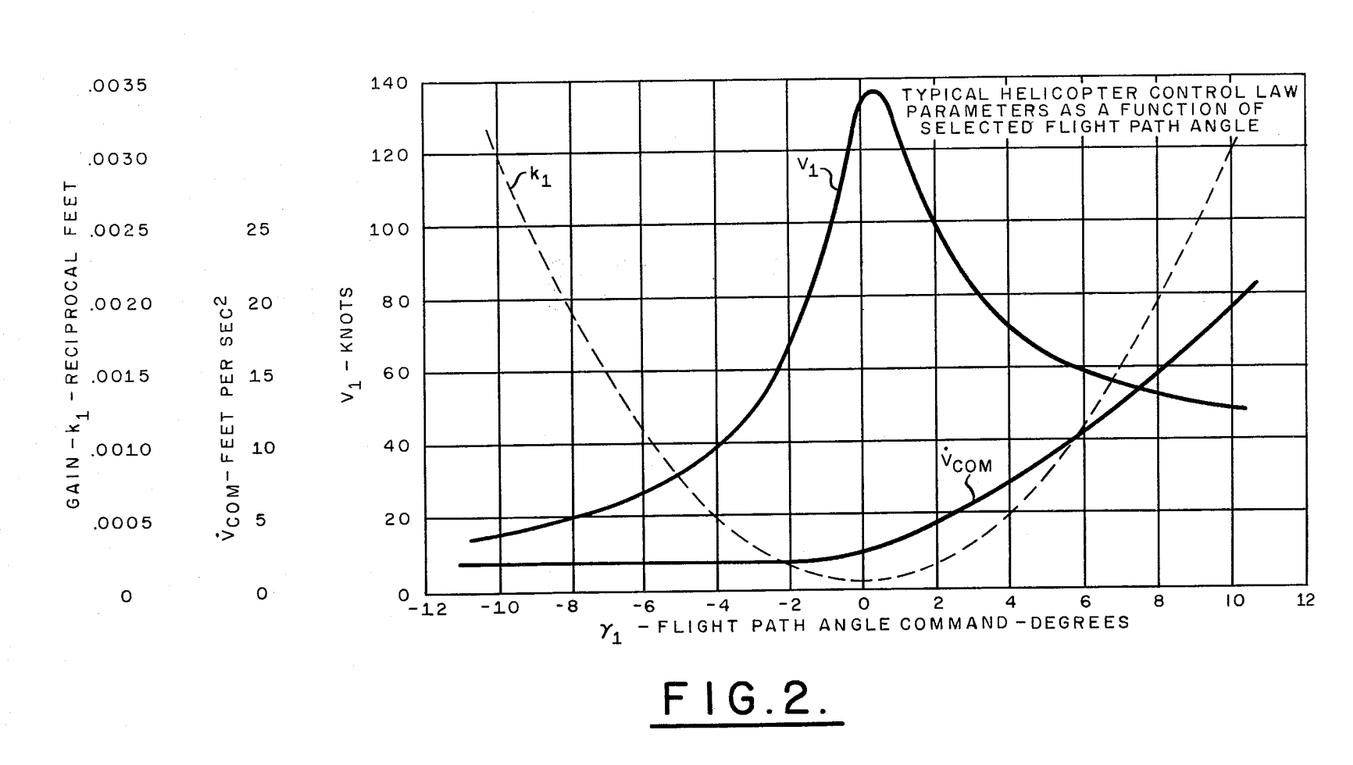
FIG. 2 is a graphical representation of typical control parameters of the invention as a function of the selectable flight path angle.

FIG. 2 shows typical values of the constants $\dot{V}_{COM}$ and $k_1$ as a function of the selectable flight path angle $\gamma_1$. These values are based on the following empirical relationships for positive values of the selected flight path angle:

$$\dot{V}_{COM} = 250 \, (\gamma_1 + 0.10)^2 \tag{3}$$

$$k_1 = 0.095 \, \gamma_1^{\,2} + 0.00005 \tag{4}$$

where $\gamma_1$ is expressed as radians, recognizing that one radian equals 57.2°. For negative value of the selected flight path angle, $\dot{V}_{COM}$ is fixed at 2 feet per second per second. The values of $k_1$ are based on the indicated $V_1$ characteristic which decreases as the selected flight path angle becomes increasingly negative.

The steady velocity $V_1$ resulting from the use of equations (3) and (4) is also shown graphically in FIG. 2. It is derived from relationship (2). The result of the use of control equations (1) through (4) is that the helicopter will be constrained to accelerate or decelerate to the value of $V_1$ which corresponds to the selected flight path angle. For example, a selected path angle to minus three degrees at a time when the helicopter is operating above the $V_1$ speed will result in a deceleration to a steady velocity of 49 knots at a constant path angle of minus 3°. A selected path angle of plus 8° at a time when the helicopter is hovering will result in an acceleration to a steady velocity of 52 knots at a constant path angle of plus 8°. A decrease in the selected path angle toward zero will result in further acceleration to a $V_1$ speed of 137 knots.

Figure 3:
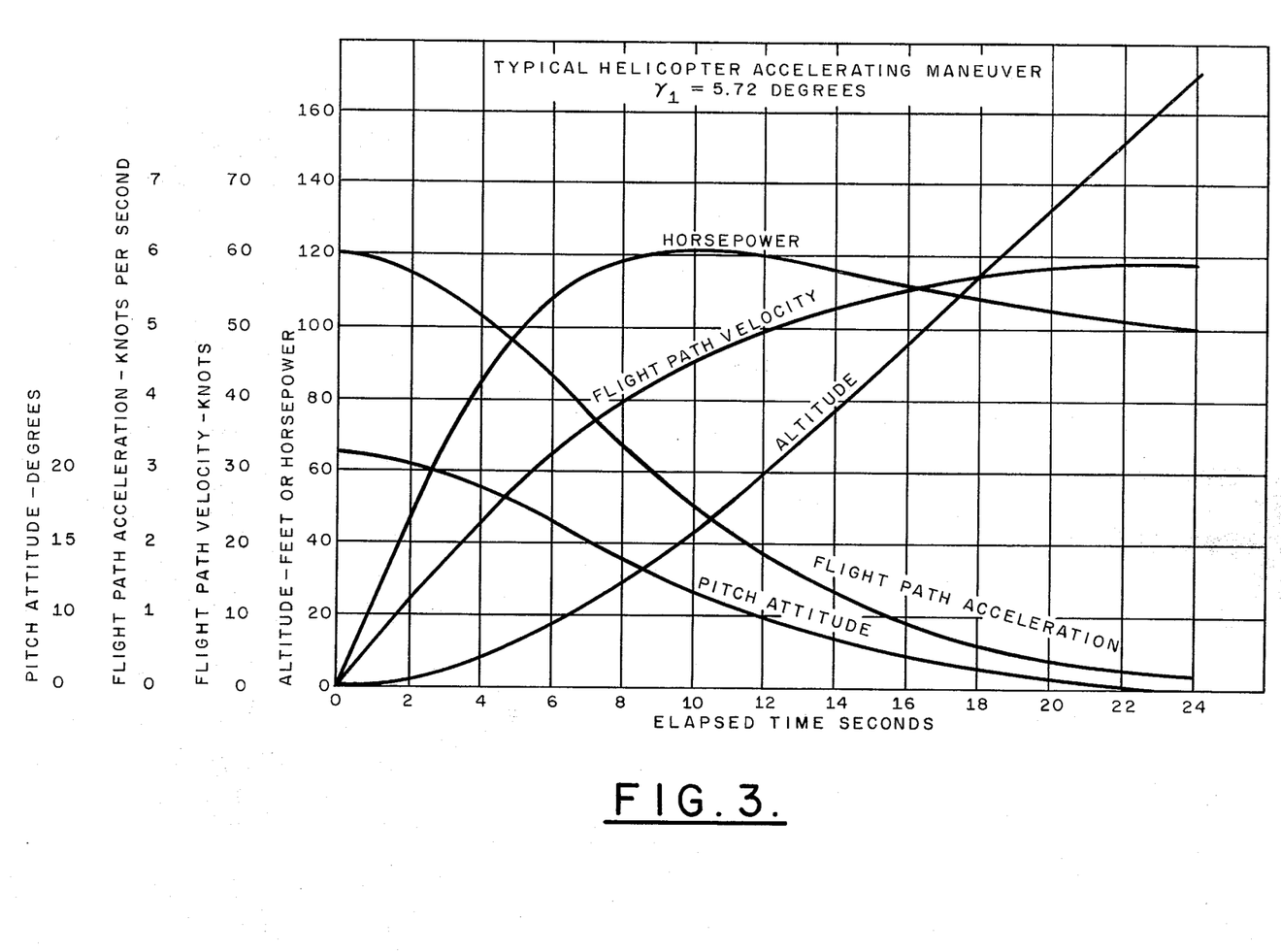
FIG. 3 is a graphical representation of typical time history of various helicopter flight parameters during take off operation of the invention at a selected flight path angle.

FIG. 3 shows typical calculated time histories of various flight parameters during a helicopter take off maneuver under the control laws resulting from equations (1) through (4) when $\gamma_1 = 0.1$ radian which is equivalent to 5.72°. An examination of the curves shows that the theoretical operation meets the requirements of the desired maneuver; namely, that flight path velocity starts at zero when the altitude above the lift off point is zero and that the velocity builds up rapidly to a safe value as the helicopter climbs. Further, the helicopter attains a steady velocity in a smooth manner within the power capability of its engine. For the example shown, the helicopter attains a safe forward speed of 30 knots within 5.5 seconds of lift off at a safe altitude of 14 feet.

The characteristics shown in FIG. 2 are also useful in maneuvering the helicopter during landing under low visibility conditions. In a typical situation the helicopter will utilize guidance from a glide slope beam and will intercept the beam at a safe altitude such as 1000 feet above the landing pad and at a safe intercept speed such as 130 knots. The capture of the glide slope beam is obtained by adjusting the flight path angle command $\gamma_1$ as a function of glide slope angle which is typically 2.5°. The deceleration resulting from programming the flight path angle command from zero to minus 2.5 degrees will cause a $V_1$ change from 130 knots to 57 knots. At a decision height such as 100 feet above the landing pad as determined by a radio altimeter, the programming of the flight path angle command $\gamma_1$ is made a function of radio altitude, causing the angle to be increasingly negative as the helicopter approaches the landing pad. The $V_1$ characteristic of FIG. 2 shows that this maneuver will result in further deceleration. For example, the $V_1$ speed corresponding to minus eight degrees is 20 knots.

The typical characteristics shown in FIG. 3 are derived by considering the forces acting at the center of gravity A of the helicopter. Referring to FIG. 1, the forces are the thrust vector T, drag vector D, and weight vector W. Equations (5) and (6) which follow are based on the balance of forces and accelerations at directions which are orthogonal to the flight path and along the flight path, respectively.

$$T \sin \mu = W \cos \gamma \tag{5}$$

where $\mu$ is the angle between the flight path OB and the thrust vector T while $\gamma$ is the flight path angle with respect to the horizontal.

$$T \cos \mu = (W/g) \dot{V} + D + W \sin \gamma \tag{6}$$

where $g$ is the constant which represents acceleration due to gravity. The drag vector is a function of forward velocity, as follows:

$$D = k_2 (½\rho V^2) \tag{7}$$

where $k_2$ is a constant which is a characteristic of the shape of the helicopter and $\rho$ is the density of the air.

From trigonometric considerations, it will be readily apparent that:

$$-\theta = \pi/2 - \theta_F - \mu - \gamma \tag{8}$$

where $\theta$ is the pitch angle of the aircraft fuselage line, $\mu$ is the angle between the thrust vector and the flight path, $\gamma$ is the flight path angle and $\theta_F$ is the angle between the thrust vector and the axis of the sustaining rotor hub. The angle $\theta_F$ between the thrust vector and the rotor hub axis is known to be an empirical function of airspeed:

$$\theta_F = k_3 V^2 \tag{9}$$

where $k_3$ is an empirical constant.

The power P required to accelerate the craft is:

$$P = TV \cos \mu \tag{10}$$

where P is expressed in foot-pounds per second.

The specific characteristics shown in FIG. 3 are based on the simultaneous solution of equations (1) through (10) using the following constant parameters for a typical helicopter:

W = 3220 pounds
$\gamma_1$ = 0.1 radian (5.72°)
$V_1$ = 100 feet per second (60 Knots)
$\dot{V}_{COM}$ = 10 feet per second $^2$ (6 knots per second)
$\rho$ = 0.00238 pound-second$^2$ per foot$^4$
$k_1$ = 0.001 foot $^{-1}$
$k_2$ = 19 feet$^2$
$k_3$ = 0.000007 rad-seconds $^2$/foot$^2$ The relationship between elapsed time $t$ from the hover point to a point a distance $r$ away is calculated by integration as follows:

$$t = \int_0^V \frac{dv}{\dot{V}} \tag{11}$$

This equation can be solved by the use of equation (1) and the constants of the specific example, as follows:

$$t = \frac{1}{2k_1 V_1} \log_e \frac{1 + \frac{V}{V_1}}{1 - \frac{V}{V_1}} \tag{12}$$

where $t$ is expressed in seconds and V is expressed in feet per second.

The relationship between range $r$ and velocity is obtained as follows:

$$r = \int_0^V V dt = \int_0^V \frac{V dV}{\dot{V}}$$

$$r = \frac{1}{2k_1} \log_e \frac{1}{1 - \left(\frac{V^2}{V_1^2}\right)} \tag{13}$$

where $r$ is expressed in feet.

The relationship between range and altitude is derived as follows:

$$h = r \sin \gamma_1 \tag{14}$$

where $h$ and $r$ are both expressed in feet.

DESCRIPTION OF THE BASIC INVENTION

Flight path angle control of the accelerating or decelerating flight of a VTOL aircraft such as a helicopter while on a constant angle path with respect to the horizontal is obtained, according to the invention, by use of novel flight director instrumentation. However, it should be understood that the inventive concepts may also be readily incorporated in an automatic flight control system wherein the command signals generated are applied to servo actuators for positioning the thrust and pitch attitude controls of the aircraft. As will be explained, thrust and pitch attitude control over the craft are exercised by the human pilot through direct observation of the flight director display. For a helicopter, collective pitch control of the rotor is used to adjust thrust T to maintain a settable flight path angle $\gamma$, while cyclic pitch control of the rotor is used to adjust the pitch attitude $\theta$ and to control acceleration (or deceleration) $\dot{V}$ while flying on the constant angle path. For these purposes, both inertial and pressure data are processed in a novel data computer, enabling the generation of the desired flight director regulating signals, as will be explained.

Figure 4:
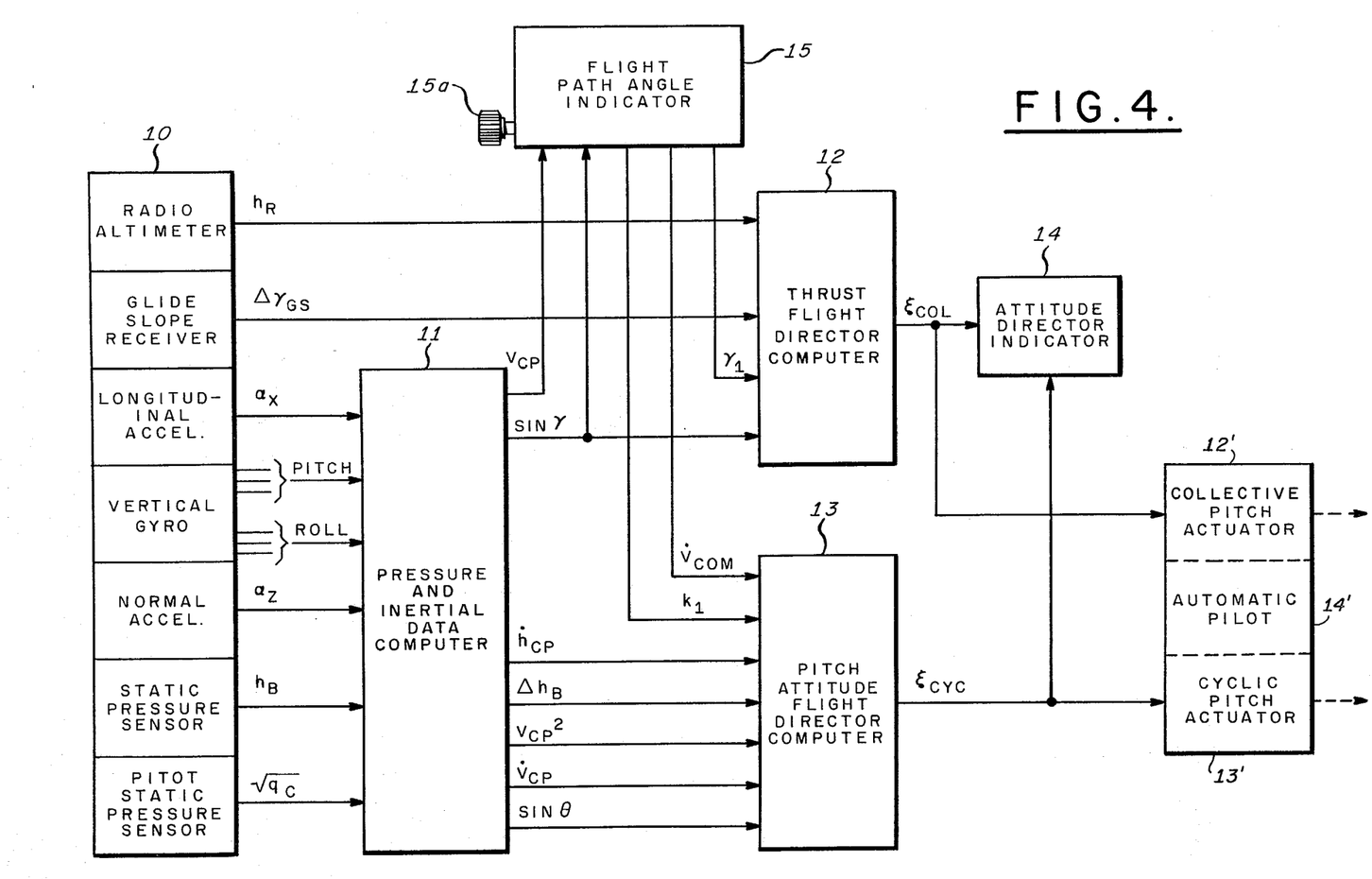
FIG. 4 is a general block diagram of the invention showing its general organization, and FIGS. 5a and 5b comprise a detailed illustration of the entire system.

FIG. 4 illustrates the general organization of the apparatus required according to the invention to obtain and to utilize flight director guidance during the described accelerating or decelerating maneuver of a helicopter. As will be seen from the detailed discussion to follow of FIGS. 5a and 5b, the sensor system 10 supplies basic air data and inertial reference information to the pressure and inertial data computer 11, which latter forms the principal portion of the apparatus of FIG. 5a. Generally, the sensor system 10 includes a radio altimeter, glide slope receiver, accelerometers, a vertical gyroscope, a static pressure sensor, and a pitotstatic pressure sensor. Thus, the sensor system 10 derives absolute altitude above the terrain $h_r$, glide slope deviation $\Delta\gamma_{GS}$ craft pitch $\theta$ and roll $\phi$ attitude data from a vertical gyroscope. The sensor system also derives altitude $h_B$ and the square root of pitot-static pressure $\sqrt{q_c}$ from pressure probes mounted in the conventional manner on the helicopter. Longitudinal and normal acceleration signals $a_x$ and $a_z$ are also supplied for processing in computer 11. Outputs of computer 11 are further manipulated in the thrust flight director computer 12 and in the pitch attitude flight director computer 13. This is done to derive useful error signals $\xi_{COL}$ and $\xi_{CYC}$ which drive conventional movable elements of the crossed pointer attitude director indicator 14 as will be explained. The commands for the desired flight path angle $\gamma_1$ and flight path acceleration $\dot{V}_{COM}$ are simultaneously generated as a function of the setting of a single control knob 15a of a flight path angle indicator 15 in accordance with the empirical data above derived and illustrated in the typical curves of FIG. 2. Further details of the respective thrust and pitch flight director computers 12 and 13, attitude indicator 14, and flight path angle indicator 15 will be presented in the detailed discussion of FIG. 5b.

In accordance with the teachings of the present invention, the thrust control law which defines the collective pitch regulating as error signal is:

$$\xi_{COL} = \gamma_1 - \gamma - k_4 \dot{\gamma} \tag{15}$$

where $\gamma_1$ is the commanded angle between the flight path OB and the horizontal and $\gamma$ is the actual flight path angle as computed in the pressure and inertial data computer 11, the value $k_4$ being a constant of proportionality for the $\dot{\gamma}$ or damping term. Similarly, the pitch attitude control law which defines the cyclic pitch regulating as error signal is:

$$\xi_{CYC} = \dot{V}_{CP} - \dot{V}_{COM} + k_1 V_{CP}^2 - k_5 \dot{\theta} \tag{16}$$

where $\dot{V}_{CP}$ is the computed acceleration of the craft along the desired flight path and $\dot{V}_{COM}$ is the initial commanded acceleration of the craft along the flight path OB. The parameter $V_{CP}$ is computed velocity of the craft along the desired flight path and $\dot{\theta}$ is the damping term and is the time rate of change of the angle between the craft fuselage reference axis and the horizontal. The values $k_1$ and $k_5$ are constants of proportionality. In the present embodiment an increase in collective pitch is called for when $\xi_{COL}$ is positive and an increase in pitch attitude is required when $\xi_{CYC}$ is positive.

PRESSURE AND INERTIAL DATA COMPUTER

Figure 5A:
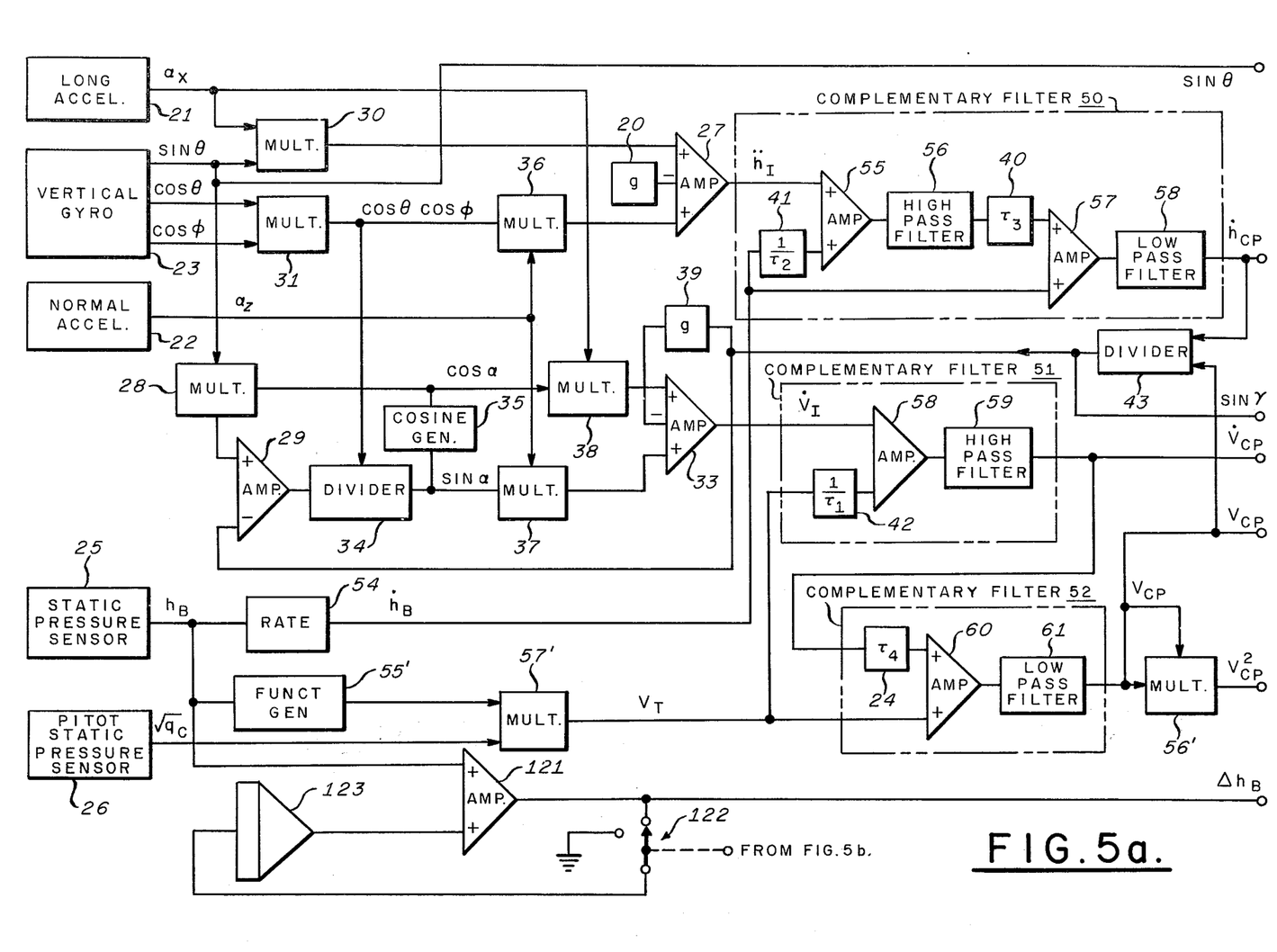

FIG. 5a represents a block diagram of a preferred embodiment of apparatus for generating the output signals of the pressure and inertial data computer 11 of FIG. 4. The output signals are representative of flight path angle $\gamma$, computed vertical speed $\dot{h}_{CP}$, computed flight path velocity $V_{CP}$, altitude deviation from a desired reference altitude $\Delta h_B$, computed flight path acceleration $\dot{V}_{CP}$ and the square of computed flight path velocity $V_{CP}^2$. The block diagram is a preferred implementation for generating signals in accordance with the mathematical relationships (17) through (24) which follow:

$$\sin \gamma = \frac{\dot{h}_{CP}}{V_{CP}} \tag{17}$$

where $\dot{h}_{CP}$ is a computed vertical speed signal which has been filtered in a complementary manner to have good fidelity over a broad band of frequencies and $V_{CP}$ is a computed flight path velocity signal which has been similarly complementary filtered to have good fidelity over the broad range of frequencies encountered.

$$\dot{V}_{CP} = \left(\dot{V}_I + \frac{VT}{\tau_1}\right)\left(\frac{\tau_1 s}{\tau_1 s + 1}\right) \tag{18}$$

where $\dot{V}_I$ is a flight path acceleration signal that is derived from inertial measures of longitudinal acceleration, normal acceleration, pitch attitude, roll attitude and angle of attack, $V_T$ is a true airspeed signal that is derived from air data measures and pitot and static pressures, and $\gamma_1$ is the time constant of a high band pass filter having transfer function $\gamma_1 S/\gamma_1 S+1$ where S is the differential operator with respect to time.

$$\dot{V}_I = a_x \cos \alpha - a_z \sin \alpha - g \sin \Gamma \qquad (19)$$

$$\sin \alpha = \frac{\sin \Theta \cos \alpha - \sin \gamma}{\cos \Theta \cos \phi} \qquad (20)$$

where $\theta$ is pitch attitude of the craft reference line of FIG. 1, $\phi$ is the roll attitude of the craft, $a_x$ is the output of an accelerometer that is strapped to the craft with its sensitive axis aligned with the pitch reference line of the fuselage, $a_z$ is the output of a normal accelerometer that is strapped to the craft center of gravity with its sensitive axis aligned orthogonal to the pitch reference line of the fuselage, and $\gamma_3$ is the angle between the flight path of the craft and craft reference line as indicated in FIG. 1.

$$\dot{h}_{CP} = \left\{ \left( \ddot{h}_I + \frac{\dot{h}_B}{\tau_2} \right) \left( \frac{\tau_2 S}{\tau_2 S+1} \right) \tau_3 + \dot{h}_B \right\} \left( \frac{1}{\tau_3 S+1} \right) \qquad (21)$$

where $\ddot{h}_I$ is a vertical acceleration signal that is derived from measures of longitudinal acceleration, normal acceleration, pitch attitude and roll attitude, $\dot{h}_B$ is a vertical velocity signal that is derived from a measure of static pressure, $\tau_2$ is the time constant of a high band pass filter with transfer function $\tau_2 S/\tau_2 S+1$, and $\tau_3$ is the time constant of a low band pass filter with transfer function $1/\tau_3 S+1$.

$$\ddot{h}_I = a_x \sin \theta + a_z \cos \theta \cos \phi - g \qquad (22)$$

where $a_x$, $\theta$, $a_z$, $\phi$, and $g$ are signals of parameters that have been previously defined.

$$V_{CP} = \left( (\tau_4 \dot{V}_{CP} + V_T) \right) \left( \frac{1}{\tau_4 S+1} \right) \qquad (23)$$

where $V_T$ and $V_{CP}$ have been previously defined and $\tau_4$ is the time constant of a low band pass filter having a transfer function $1/\tau_4 S+1$.

$$V_T = \sqrt{2 \int_0^{q_c} C} \left( \frac{\rho_0}{\rho} \right) \qquad (24)$$

where $\sqrt{2 \int C}$ is the output of a pitot-static sensor and the density ratio $\rho_0/\rho$ is a function of static pressure and the U.S. standard atmosphere characteristic.

Referring now to FIG. 5a, the output of amplifier 27 represents a signal $\ddot{h}_1$ in accordance with the requirements of relationship (22). The total input to amplifier 27 comprises the summation of a signal from a source 20 proportional to the constant g, a signal from a multiplier 30 which operates on the output signal of longitudinal accelerometer 21 and the sine $\theta$ output signal of the vertical gyroscope 23 to generate the signal proportional to the product $a_x \sin \theta$, and a third signal from multipliers 31 and 36 in cascade which together generate a signal proportional to $a_z \cos \theta \cos \phi$ from input signals from a normal accelerometer 22 and vertical gyroscope 23, the latter providing a signal proportional to $\cos \theta$ and $\cos \phi$.

The signal proportional to sine $\alpha$ as defined by equation (20) is provided at the output of a divider network 34. The numerator term of equation (20) is provided by the output of amplifier 29 which algebraically sums a signal proportional to the product of the signal $\sin \theta$ from vertical gyro 23 and a $\cos \alpha$ signal, the latter derived from a cosine generator 35 responsive to $\sin \alpha$ and connected in feedback relation around amplifier 29 and divider 34, and a signal proportional to $\sin \gamma$ from divider network 43, to be described below. The denominator term of equation (20) is simply the $\cos \theta \cos \phi$ signal described above from multiplier 31.

The output of amplifier 33 represents a signal $\dot{V}_I$ in accordance with the requirements of relationship (19). The total input to amplifier 33 comprises the summation of a signal $g \sin \gamma$ through gain adjuster 39 in conjunction with the $\sin \gamma$ output of divider 43, a signal $a_x \cos \alpha$ through multiplier 38 in conjunction with the output of cosine generator 35 and a signal $a_z \sin \alpha$ through multiplier 37 in conjunction with the $\sin \alpha$ output of divider 34.

A static pressure sensor 25 in conventional and provides an electrical output signal proportional to pressure altitude $h_B$. This signal is differentiated by rate circuit 54 to obtain a signal proportional to vertical speed $\dot{h}_B$. The altitude signal $h_B$ is also supplied to a conventional function generator 55' to obtain a signal that is equal to $\sqrt{\rho_0/\rho}$ based on the conventional density variation of the U.S. standard atmosphere. A conventional pitot-static pressure sensor 26 provides an electrical output signal proportional to the square root of impact pressure $\sqrt{q_c}$. This signal is used in conjunction with the output of the function generator 55' and a multiplier 57' to obtain a signal proportional to true airspeed $V_T$, the foregoing circuits providing the solution of equation (24).

The complementary filters 50, 51, and 52 act to wash out portions of poor quality of the basic signals supplied thereto, thereby minimizing instrumentation errors. For example, the complemented velocity signals $V_T$ and $\dot{V}_I$ provide filtered velocity data free of pitot-static source anamolies. The $\ddot{h}_I$ signal inherently has good high frequency response, but includes steady state or long term error components caused by vertical gyroscope erection errors, accelerometer biases, and the like. On the other hand, the $\dot{h}_B$ signal has a useful steady state component, but its short term or high frequency response is inherently poor. Therefore, for example, by operating upon the signals in complementary filter 50, the effects of the short term or noise components of $\ddot{h}_I$ are reduced, while the low frequency response of the $\dot{h}_B$ signal is improved or complemented. Complementary filter elements of the general type used herein are described in the literature and also in U.S. Pat. application No. 124,690 for "Angle of Attack Computer," filed Mar. 16, 1971 in the name of Harry Miller and assigned to the Sperry Rand Corporation, issued Feb. 12, 1974 as U.S. Pat. No. 3,791,208.

The output of complementary filter 50 represents a computed altitude rate signal $\dot{h}_{CP}$ in accordance with the requirements of equation (21). Filter 50 comprises amplifier 55, a conventional high pass filter 56, amplifier 57, and a conventional low pass filter 58 all connected in cascade. The input to amplifier 55 comprises the signal $\dot{h}_I$ from amplifier 27 described above and another signal proportional to barometric altitude rate $\dot{h}_B$ which is scaled by means of a gain adjuster 41 to represent $\dot{h}_B/\tau_2$ where $\tau_2$ is the time constant of high pass filter 56. The output of amplifier 55 is high pass filtered by filter 56. The output of high pass filter 56 is multiplied by a gain adjuster proportional to the time constant $\tau_3$ of the low pass filter 58 and 40 in is summed in amplifier 57 with a signal which represents rate of change of pressure altitude $\dot{h}_B$ from rate circuit 54. This signal is low pass filtered in filter 39 to provide the complemented altitude rate time $\dot{h}_{CP}$.

The output of complementary filter 51 represents a computed velocity rate along the flight path signal $\dot{V}_{CP}$ in accordance with the requirements of equation (18). Filter 51 comprises amplifier 58 and high pass filter 59 connected in cascade. The input to amplifier 58 comprises the signal $\dot{V}_I$ from amplifier 33 described above and a signal output $V_T$ of multiplier 57 which is scaled by means of gain adjuster 42 to represent $V_T/\tau_1$, where $\tau_1$ is the time constant of high pass filter 59. The sum output of amplifier 58 is high passed in filter 59 to provide the complemented $\dot{V}_{CP}$ output signal.

The output of complementary filter 52 represents a computed velocity along the flight path signal $V_{CP}$ in accordance with the requirements of equation (23). Filter 52 comprises amplifier 60 and low pass filter 61 connected in cascade. The input to amplifier 60 comprises a signal $V_T$ from multiplier 57 as described above and a signal which is the output of high pass filter 59 scaled by means of gain adjuster 24 to represent $\tau_4 \dot{V}_{CP}$, where $\tau_4$ is the time constant of low pass filter 61. The output of amplifier 60 is low passed by filter 61 to provide the complemented $V_{CP}$ output signal. The output of complementary filter 52 is squared by multiplier circuit 56' as shown to generate a signal proportional to the square of craft velocity $V_{CP}^2$.

In accordance with equation (17) above, a signal proportional to $\sin \gamma$, $\gamma$ being the actual flight path angle of the aircraft, is generated by dividing in divider circuit 43 the altitude rate signal $\dot{h}_{CP}$ from filter 50 by the velocity signal $\dot{V}_{CP}$.

Finally, a signal $\Delta h_B$ representative of altitude deviation from a reference altitude is obtained by using amplifier 121 responsive to the altitude signal $h_B$ from altitude sensor 25 connected in a follow-up mode through switch 122. With switch 122 closed the output of integrator 123 will track the $h_B$ output of static pressure sensor 25, but when an altitude hold command is received by relay solenoid 120, switch 122 will ground the input to integrator 123 resulting in the output of the integrator to remain constant at the altitude existing when solenoid 120 was energized. The output of amplifier 121 will therefore be a deviation signal between the reference and actual altitude in altitude hold mode.

Flight Guidance Computer

Figure 5B:
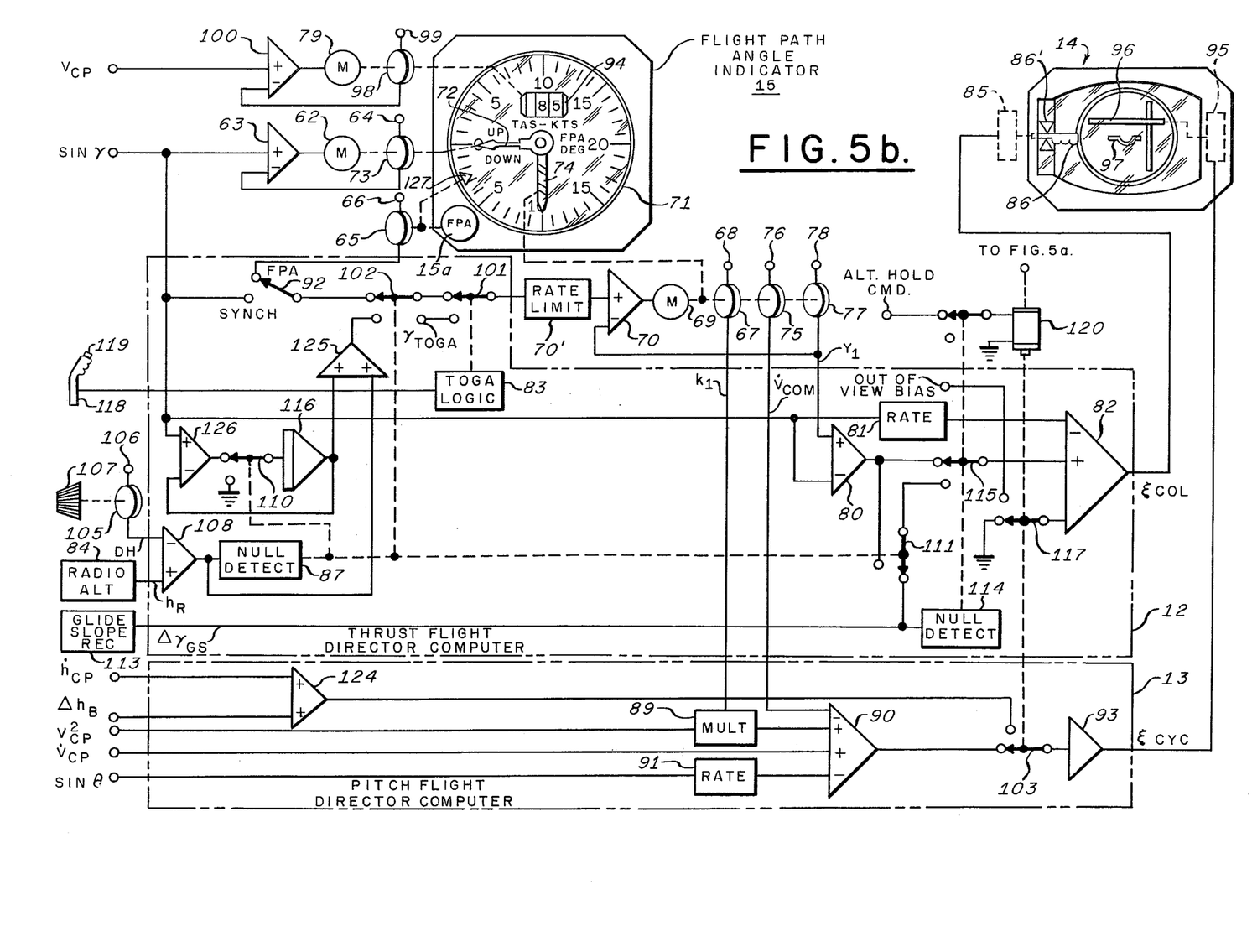

The apparatus of FIG. 5b utilizes the outputs of the FIG. 5a pressure and inertial computer 11 of FIG. 4 to compute the control command or flight director guidance signals during the accelerating or decelerating maneuvers of the air craft for actuating the flight director elements of a conventional attitude director indicator 14. It should be understood, however, that the invention concepts can also be utilized to control automatic pilot servo actuators 12' and 13' in parallel with or instead of the flight director. Examples of suitable helicopter automatic pilots are well known in the art and include those shown in the U.S. Pat. No. 2,479,549 to M. F. Bates et al, issued Nov. 10, 1943 and assigned to the Sperry Rand Corporation.

The outputs of pressure and inertial computer 11 are further processed in the system of FIG. 5b to obtain flight director or automatic pilot actuating signals $\xi_{COL}$ and $\xi_{CYC}$ in accordance with equations (15) and (16) previously discussed.

The collective and cyclic command signals are generated by computers 12 and 13, respectively, which are conditioned to operate in several modes as determined by the positions of switches 101, 102, 92, 110, 111, 115, 103, and 117, as will be explained. The system utilizes a unique flight path angle indicator 15 which displays in addition to flight path angle, true airspeed and desired flight path angle, i.e., flight path angle command. As shown, a knob 15a on the indicator provides a means for setting or inserting desired flight path angle references through bug 127. The true airspeed display 94 may be a conventional drum counter numerical presentation of the actual computed airspeed $V_{CP}$. The counter 94 is positioned by a conventional servo loop including servo motor 79 under control of amplifier 100 having electrical signal inputs from position feedback potentiometer 98 which is voltage excited on terminal 99 and the $V_{CP}$ output of complementary filter 52 of FIG. 5a. The actual flight path angle display comprises a pointer 72 which moves relative to a fixed dial 71 which, in turn, has calibrated markings to represent positive and negative flight path angles expressed in degrees. The pointer 72 is similarly positioned by a conventional servo loop including servo motor 62 under control of amplifier 63 having electrical signal inputs from position feedback potentiometer 73 which is voltage excited on terminal 64 and the $\sin \gamma$ output of divider 43 of FIG. 5a. The flight path angle command display comprises a pointer 74 that is distinctively shaped or marked compared to pointer 72 and is positioned by a further servo loop including servo motor 69 against the fixed dial 71. Motor 69 also positions potentiometers 77, 75, and 67 which are voltage excited on terminal 78, 76, and 68, respectively. The potentiometers have output characteristics which correspond to the $\dot{V}_{COM}$ and $k_1$ functions shown in the curves of FIG. 2 as a function of flight path angle command $\gamma_1$, the latter being proportional to the displacement of motor 69.

The manual flight path angle mode (FPA) is in effect when the various switches referred to above are in the positions shown in FIG. 5b. Under these conditions, motor 69, under control of amplifier 70, operates in accordance with the inputs from potentiometer 65 and potentiometer 77. Potentiometer 65 is voltage excited at terminal 66 and its output is determined by manually positioned knob 15a which also positions flight path angle select index 127 against dial 71. The electrical polarity of the signal from potentiometer 77 is opposite to that from potentiometer 65, resulting in servo motor 69 positioning pointer 74 and potentiometers 67, 75, and 77 to correspond with the manual position of potentiometer 65 and index 127, a position corresponding to the selected or reference flight path angle. In order to limit the rate of change of the flight path angle reference signal, and thereby limit the aircraft thrust and pitch rates of the aircraft, a conventional rate limiter 70' is provided. This rate limits the input to amplifier 70.

The thurst control regulating or command signal $\xi_{COL}$ is generated by amplifier 82 and 80 connected in cascade. The amplifier 82 output represents the algebraic summation of electrical signals that comprise the terms of control law expressed in equation (15); that is, electrical signals proportional to selected flight path angle $\gamma_1$ from potentiometer 77, the sine of the actual flight path angle sin $\gamma$ from divider 43 of FIG. 5a, and a flight path angle rate term $k_4\dot{\gamma}$ from rate taker 81 the latter providing a damping term for the collective control closed loop system. It should be noted that, for the relatively small flight path angles that are normally used, the electrical signal proportional to sin $\gamma$ is very nearly equal to the actual angle $\gamma$. The output of meter driving amplifier 82 operates the meter movement 85 of the attitude director indicator 14 in a manner to displace pointer 86 relative to stationary scale having an identified null point 86'. When the pilot manipulates the thrust controls of the aircraft (the collective stick of the helicopter) in a manner to keep pointer 86 on the null mark 86', he will satisfy the thrust control law by continuously solving equation (15).

The pitch attitude control regulating or commanding signal $\xi_{CYC}$ is generated by amplifier 90 and 93 connected in cascade. The output of amplifier 90 comprises a signal proportional to the algebraic summation of electrical signals proportional to the terms of the control law expressed by equation (16); that is, electrical signals proportional to the commanded acceleration along the flight path $\dot{V}_{COM}$ from potentiometer 75, the velocity squared $V_{CP}^2$ from multiplier 56' of FIG. 5a, operating through potentiometer 67 and multiplier 89 to provide $k_1 V_{CP}^2$, and the aircraft pitch rate $k_5\dot{\theta}$ generated by the sin $\theta$ signal from vertical gyro 23 of FIG. 5a operating although rate circuit 91, the latter providing a damping term for the cyclic pitch loop. The output of meter driving amplifier 93 operates the conventional meter movement 95 of attitude director 14 in a manner to displace the pitch command cue bar 96 away from the fixed reference symbol 97, the latter representing the desired null position of the pitch command cue 96. When the pilot manipulates the pitch controls the aircraft (the pitch cyclic stick of the helicopter) in a manner to keep cue 96 aligned with the fixed symbol 97, he will satisfy the pitch control law by continuously solving equation (16).

The operation of the flight control system of the present invention may be described in connection with a typical take-off maneuver reference being made particularly to FIGS. 3 and 5b. Prior to take-off, the pilot selects the desired take off flight path angle using knob 15a and bug 127 of the indicator 15, thereby positioning potentiometer 65 and driving motor 69, pointer 74, and potentiometers 67, 75, and 77 in accordance therewith. In this mode, bug 127 and pointer 74 will ultimately coincide. FIG. 3 illustrates the time histories of the various parameters involved during this maneuver, when the pilot has selected a flight path angle $\gamma_1$ of about +6° (precisely 5.72°). For this selected flight path angle, the initial commanded acceleration along the flight path $\dot{V}_{COM}$ will be 6 knots per second per second and the value of the gain of the velocity term $k_1$ will be 0.0010 (FIG. 2). After helicopter lift-off to a suitable hover height of a few feet (although illustrated as zero in FIG. 3), the thrust command pointer 85 will be below its zero reference 86', thereby commanding increased thrust and the pitch command pointer 96 will be above its zero reference 97 thereby commanding a pitch down attitude. The pilot increases thrust and pitches the craft downward until the pointer 86 and 96 are zeroed and in so doing increases thrust and decreases pitch attitude, the former increasing craft altitude and the latter accelerating the craft forward. The resultant actual movement of the craft is detected by the pressure and inertial computer of FIG. 5a which supplies craft feedback signals which arrest movement of the pointer 86 and 96 when the commands are satisfied. Damping of this craft maneuver is provided by the flight path angle rate and pitch attitude rate terms. Thereafter, by the pilot continuously and simultaneously adjusting the craft thrust and pitch controls to maintain the pointers on their respective zero indexes, command equations (15) and (16) will be continuously and simultaneously solved and the craft will climb out along the +6° flight path at an initial high acceleration and increasing velocity. As the altitude increases, the acceleration decreases and velocity increases, the craft ultimately achieving the constant velocity and altitude predetermined by the initial setting of the flight path angle. The detailed functions of the various elements of the system will be obvious to those skilled in the flight control art and a detailed discussion thereof is deemed unnecessary, particularly in view of the exemplary curves of FIGS. 2 and 3.

Other modes of operation of the control system of the present invention are available to the pilot. One such sub-mode may be utilized for take off or go-around (designated TOGA in FIG. 5b) when it is desired to fly a predetermined or preset flight path. This mode is provided by means of a discrete logic signal from a push button 119 on the control stick 117 eliminating the necessity of the pilot reaching and manually positioning indicator knob 15a and thereby potentiometer 65. This operation is obtained through TOGA logic circuit 83 which causes switch 101 to contact an electrical source which provides a fixed flight path angle signal, designated $\gamma_{TOGA}$ in FIG. 5b. In this manner, potentiometers 77, 75, and 67 are positioned to a point which reflects the preset value of flight path angle command for take off and go-around, which value, for example, may be six degrees in a positive or upward direction. The combined use of the TOGA logic circuit 83 and a prior setting of manual potentiometer 65 through FPA knob 15a provides the capability of a multiple step TOGA maneuver. For example, in a two-step maneuver, if it is desired to climb first to a safe altitude along the preset or predetermined six degree flight path angle inclination and then to change to a flight path which will accelerate the aircraft to an increased speed, the pilot can initially set potentiometer 65 to a lower value, such as, for example, 0°. The pilot then initiates the maneuver by actuating push button 119 for the first step putting switch 110 to $\gamma_{TOGA}$ position, thus changing the command for the manual setting value of zero degrees to the preset value of 6° and following the flight director command cues 86 and 96 until a safe altitude is obtained. He will then actuate the push button 119 a second time, releasing TOGA logic switch 101 to reflect the manually set $\gamma_1$ command of zero degrees. In accordance with the characteristics shown in FIG. 2, the first step of the TOGA maneuver will result in an acceleration to 59 knots on a path angle of 6° followed by a second acceleration to 134 knots at a zero flight path angle.

Another mode of operation of the apparatus of the present invention permits the control of the aircraft to capture and track a glide slope radio beam at airports or heliports where such a beam is provided. The complete glide slope control sequence involves intercept of the glide slope beam at a safe altitude and airspeed, capture of the beam when the aircraft has crossed the null of the beam, tracking of the aircraft on the glide slope beam, deceleration of the aircraft to a lesser speed and, finally, further deceleration to hover when the aircraft descends below a preset decision height. A typical glide slope intercept altitude is 1000 feet above the landing pad; typical intercept speed is 130 knots; typical glide slope inclination is negative 2.5°; typical decision height is 100 feet. The following paragraphs describe the operation of the invention for providing automatically sequenced glide slope guidance.

The automatically sequenced glide slope mode would normally start with the pitch flight director computer 13 operating in the altitude hold mode. This mode is established through mode relay 120. Switch 103 causes meter driver amplifier 93 to be actuated in accordance with the summation of computed vertical speed signal $\dot{h}_{CP}$ from complementary filter 50 of FIG. 5a and altitude deviation signal $\Delta h_B$ from amplifier 121 of FIG. 5a through amplifier 124. During the altitude hold mode, the thrust command cue 86 may be biased out of view by means of the bias voltage through switch 117 of altitude hold relay 120. The signal appearing at the output of amplifier 80 reflects the SYNCH mode position of switch 92, which causes the command pointer 74 to be synchronized with actual flight path angle of the craft through servo 69, maintaining the output of amplifier 80 essentially zero. The pilot will manually adjust thrust to a fixed value necessary to obtain a desired approach speed and will adjust pitch attitude using the guidance of flight director command cue 96 which is responding to altitude hold error or deviation signals through switch 103.

When the aircraft approaches the center of the glide slope beam, a detector 114, responsive to a null or predetermined low value of signal output from glide slope receiver 113, will release altitude hold relay solenoid 120. This causes the pitch command to revert to the acceleration control mode through amplifier 90, removes the bias voltage from the collective command cue 86 and switches switch 115 to connect the signal lead to glide slope receiver 113 through switch 111 to amplifier 82. Thus, the thrust regulating signal $\xi_{COL}$ from amplifier 82 will now reflect a summation of glide slope deviation and rate of change of flight path angle by means of the sin $\gamma$ input to rate circuit 81, the latter constituting the path damping term. The actual flight path of the aircraft will therefore align itself with the inclination of the glide slope beam. The FPA command pointer 74 and potentiometers 67, 75, and 77 that are coupled to it will be positioned by servo motor 69 to be synchronized with actual flight path angle of the craft through the SYNCH contact of switch 92 and motor amplifier 70. It will be noted that the flight path angle signal $\gamma_1$ will be rate limited to limit pitch rate through $V_{COM}$. The pitch attitude regulating signal $\xi_{COL}$ will command the pilot, through the rate limited $V_{COM}$ signal, to decelerate the aircraft to a speed or velocity $V_1$ corresponding to the negative inclination of the flight path, i.e., the glide slope beam inclination. In the typical case of 2.5° of glide slope inclination the $V_1$ speed will be 57 knots as indicated by the FIG. 2 characteristics.

The aircraft will descend on the glide slope inclination until a decision height (DH) is attained, this height is determined by a radio altimeter 84 operating a null detector 87. The input to the null detector comprises the algebraic sum of a settable DH output from potentiometer 105 and the $h_R$ output of radio altimeter 84 through amplifier 108. The decision height occurs when the polarity of the output of amplifier 108 changes sign causing null detector 87 to trip and position switch 102 to lead the output of amplifier 125 to the input of motor amplifier 70, thereby enabling the inputs to amplifier 125 to control the position of flight path angle command motor 60. However, prior to operation of null detector 87, integrator 116 operating through switch 110 and amplifier 126 provides an output signal which tracks the sin $\gamma$ signal in a manner similar to the altitude SYNCH/hold circuit 121–123 of FIG. 5a. Operation of null detector 87 will simultaneously switch contacts 102, 110, and 111 away from their positions shown in FIG. 5b. Switch 111 removes the output of glide slope receiver from amplifier 82 and substitutes the output of amplifier 80 which is the difference between actual flight path angle sin $\gamma$ and flight path angle command $\gamma_1$. Switch 102 will remove the sin $\gamma$ signal as an input to motor amplifier 70 and substitute the output of amplifier 125, which is the sum of radio altitude deviation from the decision height DH and the output of integrator 116. Switch 110 will stop the follow up action of integrator 116 by grounding its input at the flight path angle value existing when the decision height null director first operated. The net effect of this operation at the decision height is to cause the flight path angle command $\gamma_1$ to become increasingly negative as the helicopter approaches the landing pad. The characteristics shown in FIG. 2 indicate that the aircraft will continue to decelerate as it approaches the hover point at the landing pad.

Accordingly, the invention provides a novel control system for achieving safe helicopter flight along a constant angle flight path in the accelerating or decelerating modes, particularly in take off or landing modes of flight. The novel instrumentation includes a thrust control system to maintain a settable flight path angle and a pitch attitude control system for acceleration or deceleration of the craft while on the desired constant flight path. The invention employs processing of inertial and pressure sensor data for generating flight director regulating signals for use by the human pilot. Combined operation of the collective and cyclic rotor blade pitch controls assures that the helicopter will change its airspeed as a function of its altitude, minimizing the chances of a serious accident in consequence of an engine failure at low airspeed. The invention enables the pilot to accomplish the desired accelerating maneuver even when visual ground cues are not available due to poor visibility.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Apparatus by means of which an aircraft may be controlled so as to follow a selectable flight path relative to the horizontal at a programmed acceleration therealong to a predetermined constant velocity through adjustment of the thrust and pitch attitude controls of said aircraft, the combination comprising:

means for selecting a desired flight path angle and providing a flight path angle reference signal in accordance therewith, means for providing a signal in accordance with the actual flight path angle, means responsive to the algebraic sum of said flight path angle reference and actual flight path angle signals for providing a thrust control command signal, means for providing an acceleration reference signal, means for providing a signal in accordance with the actual acceleration of said aircraft along said selected flight path, means for providing a signal proportional to a predetermined function of the velocity of said aircraft along said flight path, means responsive to the algebraic sum of said reference acceleration signal, said actual acceleration signal, and said signal proportional to a predetermined function of said velocity for providing a pitch control command signal, and utilization means responsive to said command signals adapted to govern the adjustment of said thrust and pitch controls of said aircraft whereby if the thrust and pitch of said aircraft are simultaneously controlled in accordance with the operation of said utilization means such as to maintain said command signals zero, said aircraft will follow said selectable flight path at said programmed acceleration along said selectable flight path to said predetermined constant velocity.

2. The apparatus as set forth in claim 1 further including:

a means for providing a signal in accordance with the rate of change of said actual flight path angle, and means for combining said actual flight path angle rate of change signal with said flight path angle reference signal and said actual flight path angle signal whereby said thrust control command signal includes a thrust control damping component.

3. The apparatus as set forth in claim 2 further including:

means for providing a signal in accordance with the rate of change of aircraft pitch attitude, and means for combining said pitch attitude rate of change signal with said acceleration reference signal, said actual acceleration signal, and said signal proportional to a predetermined function of the velocity of said aircraft along said flight path, whereby said pitch control command signal includes a pitch attitude damping component.

4. The apparatus as set forth in claim 1 further including:

means for controlling the gain of said signal proportional to a predetermined function of the velocity of said aircraft.

5. The apparatus as set forth in claim 4 further including:

means responsive to the operation of said desired flight path angle selecting means for controlling the value of said acceleration reference signal and the gain of said signal proportional to a predetermined function of the velocity of said aircraft as a function of the desired flight path angle.

6. The apparatus as set forth in claim 5 wherein the predetermined function of said aircraft velocity is the square function.

7. The apparatus as set forth in claim 5 wherein said means for selecting said desired flight path angle comprises:

indicator means including cooperable pointer and scale means for indicating the value of flight path angle, flight path angle selector means, means responsive to the operation of said flight path angle selector means for relatively positioning said pointer and scale means to indicate the selected flight path angle, and further means responsive to the operation of said flight path angle selector means for providing said acceleration reference signal and a signal for varying the gain of said signal proportional to a predetermined function of the velocity of said aircraft.

8. The apparatus as set forth in claim 7 wherein said indicator means further includes:

further pointer means cooperable with said scale means, and means responsive to said actual flight path angle signal for relatively positioning said further pointer and scale means in accordance with said actual flight path angle.

9. The apparatus as set forth in claim 8 wherein said indicator means further includes:

further indicator means for indicating the actual velocity of said aircraft, and means responsive to said velocity signal for positioning said velocity indicator means for displaying aircraft velocity.

10. The apparatus as set forth in claim 5 further including:

means for providing a predetermined fixed bias signal corresponding to an optimum safe flight path angle, and switch means operable at will for supplying said bias signal to said flight path angle selecting means for providing a predetermined flight path angle reference signal and corresponding acceleration reference signal and velocity gain value.

11. The apparatus as set forth in claim 5 further including:

glide slope radio receiver means for providing a signal in accordance with the displacement of said aircraft from a radio defined flight path inclined at a predetermined angle relative to the horizontal, switch means responsive to a predetermined low value of said glide slope displacement signal for supplying said glide slope displacement signal to said thrust control command error signal responsive means and disconnecting said flight path angle reference signal therefrom, whereby the craft is governed to fly along said glide slope, and further switch means for supplying said actual flight path angle signal to said flight path angle selecting means for controlling said acceleration reference signal and velocity gain value in accordance with the actual flight path angle, whereby the craft acceleration reference signal and velocity gain is governed in accordance with said predetermined angle of said radio glide slope.

12. The apparatus as set forth in claim 11 further including:

means responsive to the rate of change of said actual flight path angle signal, and means supplying said last mentioned signal to said thrust control command error signal responsive means to provide a radio displacement damping signal.

13. The apparatus as set forth in claim 1 wherein said utilization means comprises a flight director indicator having thrust command pointer means and pitch command pointer each moveable relative to a zero reference indiciasm and actuator means for each pointer means responsive respectively to said thrust and pitch control command signals.

14. The apparatus as set forth in claim 1 wherein said utilization means comprises an automatic pilot apparatus including a thrust control actuator system and a pitch control actuator system responsive respectively to said thrust and pitch control command signals.

15. The apparatus as set forth in claim 1 further including: means for limiting the rate of change of said flight path angle reference signal.

16. The apparatus as set forth in claim 1 further including:
altimeter means including means for providing a signal in accordance with the absolute altitude of said craft below a predetermined absolute altitude,
means responsive to said actual flight path angle signal for providing a fixed signal in accordance with the actual flight path angle obtaining at said predetermined absolute altitude, and
switch means operable at said predetermined absolute altitude for supplying the algebraic sum of said absolute altitude and fixed flight path angle signal to said flight path angle selecting means to continuously increase said reference flight path angle signal as the craft absolute altitude decreases.

17. Apparatus by means of which an aircraft may be controlled so as to follow a selectable flight path relative to the horizontal at a programmed acceleration therealong to a predetermined constant velocity through adjustment of the thrust and pitch attitude controls of said aircraft, the combination comprising:

first computer means for providing a first control command signal $\xi_1$ in accordance with the relationship:

$$\xi_1 = \gamma_1 - \gamma - k\,\dot\gamma$$

wherein the terms thereof are provided by electrical signals having respective values proportional to
$\gamma_1$ = selectable flight path angle,
$\gamma$ = actual flight path angle,
$\dot\gamma$ = rate of change of flight path angle, and
$k$ = a gain constant, second computer means for providing a second control command signal $\xi_2$ in accordance with the relationship:

$$\xi_2 = V - V_1 + k'\,f(V) - k''\,\dot\theta$$

wherein the terms thereof provided by electrical signals having respective values proportional to
$V_1$ = programmed acceleration along the flight path,
$V$ = actual acceleration along the flight path,
$f(V)$ = a function of actual velocity along the flight path,
$\dot\theta$ = rate of change of pitch attitude,
$k'$ = a first gain constant, and
$k''$ = a second gain constant, aircraft guidance means including first means for determining the adjustment of the thrust controls of said aircraft and second means for determining the adjustment of the pitch controls of said aircraft, and means for supplying said first control command signal to said first guidance means and means for supplying said second control command signal to said second guidance means, whereby if the thrust and pitch of said aircraft are simultaneously controlled in accordance with the operation of said guidance means such as to maintain said command signals zero, said aircraft will follow said selected flight path at said programmed acceleration along said selectable flight path to said predetermined constant velocity.

* * * * *